United States Patent [19]

Currie

[11] 4,057,276

[45] Nov. 8, 1977

[54] GUTTER CLEANING APPARATUS

[76] Inventor: Grover C. Currie, Rte. 1, Box 345-C, Lenoir, N.C. 28645

[21] Appl. No.: 722,803

[22] Filed: Sept. 13, 1976

[51] Int. Cl.$^2$ .................... B25J 1/00; E04D 13/06
[52] U.S. Cl. .................................................. 294/19 R
[58] Field of Search ............ 294/19 R, 22, 50.6, 294/50.8, 50.9, 70; 15/104.3 G, 236 R; 56/332, 333, 400, 12

[56] References Cited

U.S. PATENT DOCUMENTS

| 2,646,304 | 7/1953 | Chadwick | 294/19 R |
| 2,654,626 | 10/1953 | Rice | 294/50.8 |
| 2,720,409 | 10/1955 | Griffith | 294/19 R |
| 3,626,542 | 12/1971 | Despain et al. | 294/19 R X |
| 3,743,339 | 7/1973 | Brackett | 294/19 R |
| 3,972,552 | 8/1976 | Earp | 294/19 R |

FOREIGN PATENT DOCUMENTS 1,159,793    2/1958    France ........................ 294/50.8

Primary Examiner—Johnny D. Cherry
Attorney, Agent, or Firm—Bell, Seltzer, Park & Gibson

[57] ABSTRACT

An apparatus for remotely cleaning an overhead gutter or the like and which includes an elongate pole, a pair of scoops pivotally mounted at the upper end of the pole, and a cord for selectively pivoting the scoops together to collect the debris therein. The scoops are relatively large, and they collectively form an enclosure of substantial volume upon being pivoted together to thereby permit the collection of a considerable amount of the debris upon each closing operation. Also, a pair of tines extend forwardly from each scoop to positively grasp any debris which may be between the scoops when the scoops are not able to be fully closed.

10 Claims, 8 Drawing Figures

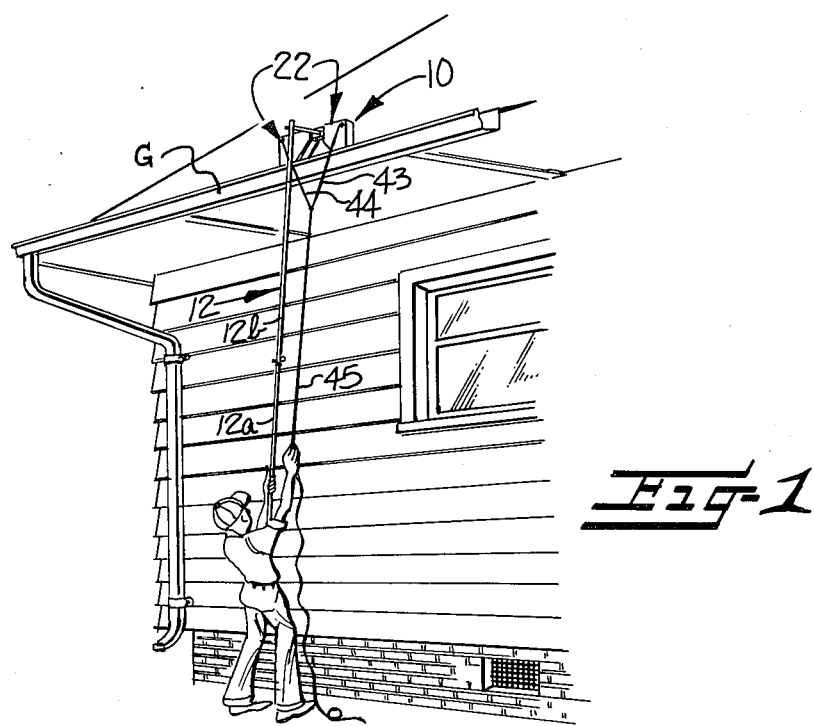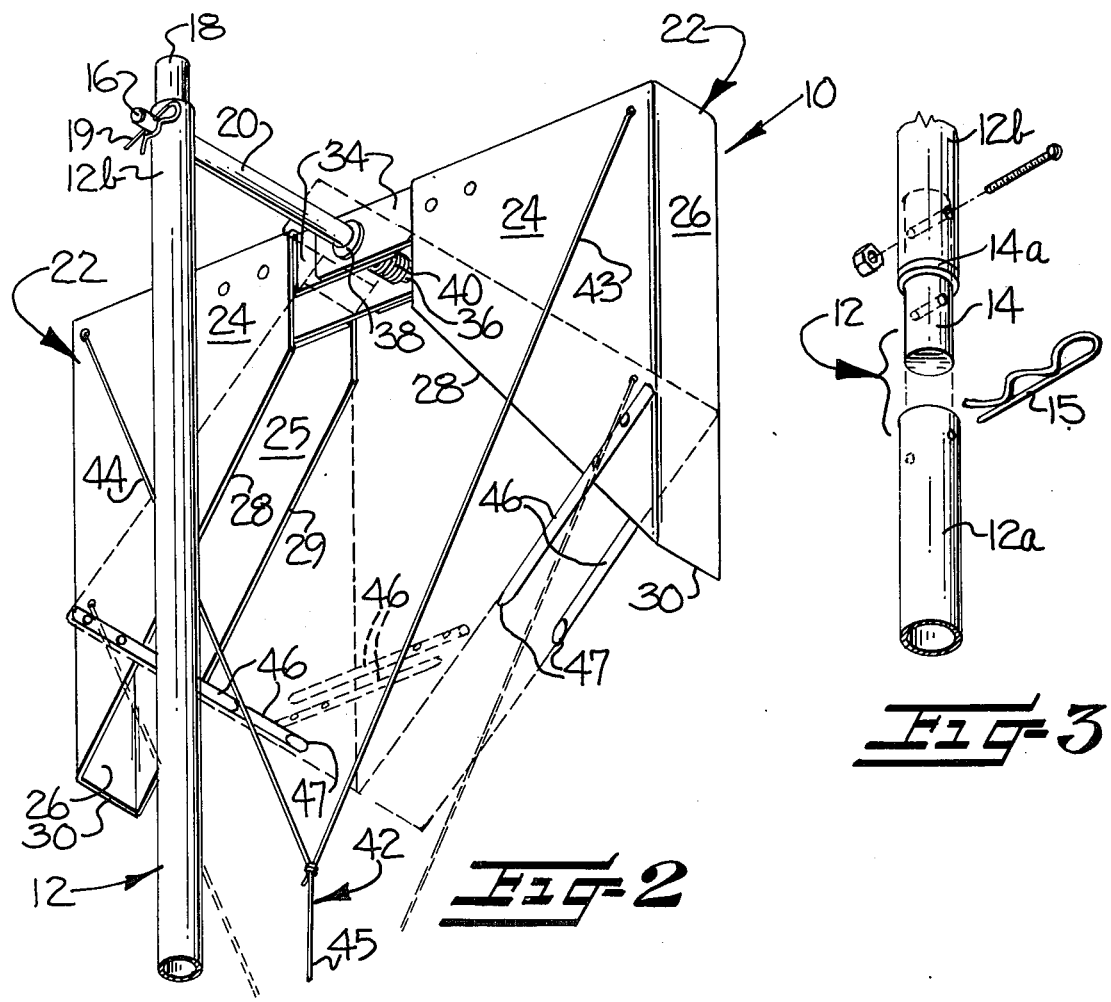

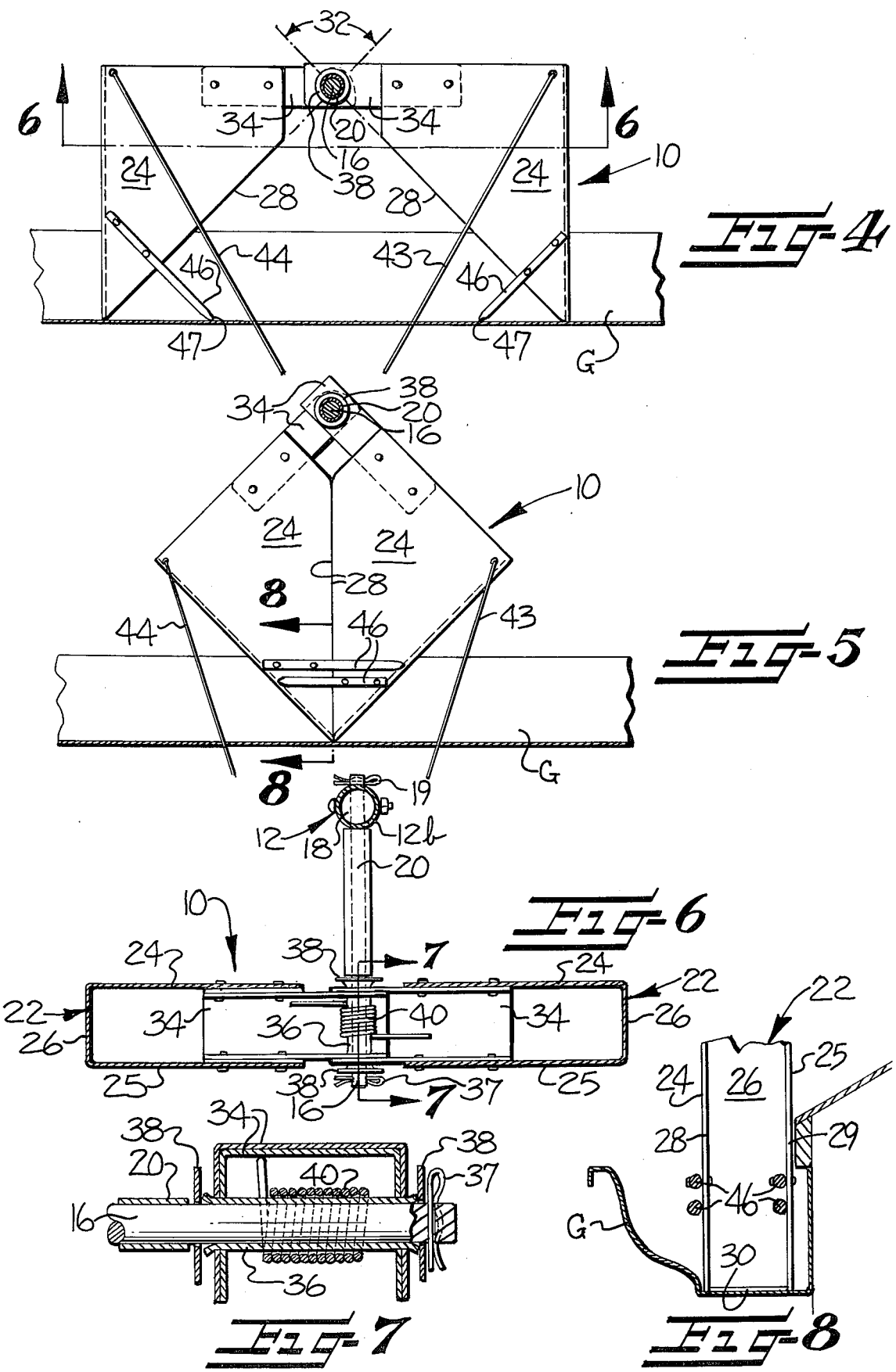

GUTTER CLEANING APPARATUS

The present invention relates to an apparatus for remotely removing accumulated leaves or other debris from an overhead gutter of a building or the like.

The need to periodically clean the gutters or houses and other buildings by removing the leaves and other debris which accumulate therein is well recognized. Most commonly, such cleaning is accomplished by climbing a ladder to reach the gutter, and then manually reaching into the gutter to lift out the debris. As any homeowner will verify, this is a time consuming and laborious operation, and it also involves a safety hazard by reason of the many times the ladder must be positioned and ascended to clean all of the gutters of a typical home.

To alleviate the above problems, various devices have heretofore been proposed for reaching into an overhead gutter from ground level. For example, the patent to Griffith, U.S. Pat. No. 2,720,409 discloses a pair of crossed tongs mounted at one end of a pole, a fulcrumed lever having a cord attached thereto for opening the tongs, and a spring for closing the tongs to grasp the debris therebetween. This device is not seen to be satisfactory however, since the tongs are able to grasp only a very small amount of debris therebetween, thus requiring an excessive number of repeated grasping operations to clean the entire gutter system. Further, the fact that a spring is used to close and hold the tongs closed renders it likely that the tongs will be unable to penetrate and pick up matted or heavy debris, such as wet leaves, and further renders it likely that at least a portion of the debris will drop from between the tongs while the device is being lifted upwardly from the gutter. Also, the angularity of the tongs is not readily adjustable, thereby rendering it difficult to reach in a plurality of directions from a single position, such as where it is desired to clean a length of the gutter from a window location.

The patent to Brackett, U.S. Pat. No. 3,743,339, shows a gutter cleaner which includes a slidable jaw which is moved against a stationary jaw to collect the debris. The slidable jaw is operated by a complicated cable and pulley system, which would undoubtedly be expensive, and also renders the device subject to failure by reason of the debris interfering with the cable and pulley system.

It is accordingly an object of the present invention to provide a gutter cleaning apparatus which is able to efficiently remove leaves and other debris from an overhead gutter, and which overcomes the above noted deficiencies of the prior devices of this type.

It is another object of the present invention to provide a gutter cleaning apparatus which comprises a pair of pivotal scoops which may be brought together to collect the debris, and which is able to collect and totally enclose a relatively large volume of the debris upon each closure thereof.

It is still another object of the present invention to provide a gutter cleaning apparatus of the described type and which has a pair of scoops which are adapted to be positively closed upon the debris to permit the scoops to readily penetrate and grasp matted debris, and which further is able to positively grasp any debris between the scoops when the scoops are not able to be fully closed.

It is also an object of the present invention to provide a gutter cleaning apparatus of the described type wherein the scoops automatically assume their proper operative position in the gutter, regardless of the angular disposition of the pole.

It is a further object of the present invention to provide a gutter cleaning apparatus which may be readily adjusted in length to efficiently reach overhead gutters at varying elevations, and which may be readily disassembled to facilitate shipment and storage.

These and other objects and advantages of the present invention are achieved in the embodiment illustrated herein by the provision of an apparatus which comprises an elongate pole having a pair of cooperating scoops pivotally mounted at one end thereof. Each of the scoops has a relatively large internal cavity, and they are mounted for relative pivotal movement between an open position wherein the cavities are separated, and a closed position wherein the cavities are substantially face to face and the scoops collectively define an enclosure of substantial volume. Means are provided for selectively pivoting the scoops between the open and closed positions, such that a workman may lower the scoops into an overhead gutter with the scoops in their open position, and then pivot the same to their closed position to collect a substantial quantity of debris within the enclosure.

In the preferred embodiment illustrated and described herein, one or more tines extend forwardly from each scoop in a direction generally toward the other scoop such that the tines penetrate and grasp any debris positioned between the scoops as they are pivoted to their closed position. Further, the pivoting means comprises a cord for pivotally and positively closing the scoops, and a spring for returning the scoops to their open position.

Some of the objects of the invention having been stated, other objects will appear as the description proceeds, when taken in connection with the accompanying drawings, in which:

FIG. 1 is a perspective view illustrating an apparatus embodying the present invention, and illustrating the manner in which the apparatus is operated to remotely remove debris from an overhead gutter;

FIG. 2 is a perspective view of the upper portion of the apparatus shown in FIG. 1;

FIG. 3 is an exploded perspective view illustrating the manner in which the sections of the pole are releasably interconnected;

FIG. 4 is a side elevation view, partly sectioned, illustrating the scoops of the apparatus in their open position;

FIG. 5 is a view similar to FIG. 4 but illustrating the scoops in their closed position;

FIG. 6 is a vertical sectional view taken substantially along the line 6—6 of FIG. 4;

FIG. 7 is a sectional view taken substantially along the line 7—7 of FIG. 6; and FIG. 8 is a sectional view taken substantially along the line 8—8 of FIG. 5.

Referring more specifically to the drawings, a preferred embodiment of an apparatus which incorporates the features of the present invention is illustrated generally at 10. The apparatus comprises an elongate pole 12 consisting of a plurality of interconnected sections 12a, 12b, with each section comprising a lightweight metal tube having an internal reinforcing plug 14 extending from one end for telescopically receiving the hollow open end of an adjacent section. Also, a removable cotter pin 15 extends transversely through the plug 14 and open end of the adjacent section to releasably interconnect the same, note FIG. 3. By this arrangement, the pole 12 may be readily disassembled to facilitate shipment and storage. While only two sections 12a and 12b are illustrated, it will be understood that additional sections may be employed to reach gutters at higher elevations.

The upper end of the pole 12 mounts a support rod 16 which extends in a direction substantially perpendicular to the axis of the pole. More particularly, the upper end of the pole section 12b fixedly carries a plug 18, and the rod 16 extends through an aperture in the pole and plug 18. A cotter pin 19 engages the opposite side of the rod for releasably maintaining the assembly thereof. Also, a spacer sleeve 20 overlies a substantial portion of the length of the rod 16.

A pair of cooperating scoops 22 are pivotally mounted on the remote end of the rod 16, and are held in spaced relation from the pole by the spacer sleeve 20. Each of the scoops 22 comprises a pair of spaced apart flat side walls 24, 25 lying in parallel planes which are perpendicular to the axis of the rod 16, and a bottom wall 26 extending between the side walls. The side walls 24, 25 have a generally triangular outline with the bottom wall 26 extending along one edge thereof, and the side and bottom walls have coplaner forward edges 28, 29, 30 respectively, which define a plane 32 which includes the axis of the rod 16, note FIG. 4.

Each scoop 22 further comprises a U-shaped channel 34 which extends outwardly from one corner thereof, and the two channels 34 are overlapped and receive the rod 16 transversely therethrough in the manner best seen in FIGS. 4–7. In this regard, the point at which the rod 16 extends through the channels 34 generally corresponds to one corner of the generally triangular outline of the side walls 24, 25, such that the forward edges 28, 29 are positioned entirely on one side of the rod 16. Also, the scoops 22 are mounted in opposing aligned relation on the rod such that the forward edges 28, 29, 30 generally face each other.

The two scoops are pivotally mounted to the rod by an arrangement which includes a sleeve 36 coaxially overlying the remote end of the rod and extending through the two channels, note FIG. 7. The outer ends of the sleeve 36 are flared slightly to preclude its withdrawal from the channels, and thereby maintain the scoops in assembled relationship. The sleeve 36 is freely rotatable about the rod 16, and the sleeve 36 and thus the scoops 22 are releasably secured to the rod by the cotter pin 37 and washers 38, thereby permitting the scoops to be readily disassembled therefrom to further facilitate shipment and storage of the apparatus 10.

The side walls 24, 25 and bottom wall 26 of each scoop define a cavity of substantial volume, and in this regard, the side walls typically measure about 13 inches from the axis of the rod to the forward edge 30 of the bottom wall, and the bottom wall 26 is about 9½ inches in length and 1¾ inches in width. The scoops 22 are pivotal between an open position as seen in FIGS. 2 and 4 wherein the forward edges 28, 29, 30 of the scoops are separated and disposed at an angle of about 90° with respect to each other and face generally toward the lower end of the pole, and a closed position as seen in FIG. 5 and in dashed lines in FIG. 2 wherein the forward edges substantially contact each other in a face to face relationship such that the scoops collectively define an enclosure of substantial volume.

A coil spring 40 is coaxially disposed about the sleeve 36 and rod 16 within the channels 34, with the ends of the spring 40 contacting the channels to resiliently bias the same from the closed position of FIG. 5 toward the open position of FIG. 4. In this regard, the overlapping of the end of one of the channels 34 with the other channel precludes further relative rotation of the scoops beyond the horizontally aligned position of FIG. 4.

Means are also provided whereby the workman holding the lower end of the pole 12 may selectively pivot the scoops 22 between the open position of FIG. 4 and the closed position of FIG. 5. This pivoting means includes a cord 42 having a Y-shaped configuration and which includes a pair of upper segments 43, 44 and a unitary lower segment 45 and with each upper segment 43, 44 being attached to one of the scoops 22 at a point horizontally spaced from the axis of the rod 16 when in the open position of FIG. 4. The lower segment 45 is of a length sufficient to reach the lower end of the pole. Thus to close the scoops, the workman merely pulls downwardly on the lower segment 45 of the cord, and to reopen the scoops, the workman releases the cord such that the scoops are pivoted to the open position by the spring 40.

In order to facilitate the grasping of any debris which lies between the scoops, the apparatus of the present invention further includes a tine 46 attached to each side wall 24, 25 of each scoop and extending forwardly therefrom. As will be apparent, the tines 46 serve to penetrate and grasp the debris between the scoops prior to the complete closing thereof, which is advantageous in the event the scoops are not able to be completely closed by reason of a stick or the like being positioned therebetween. The tines 46 extend substantially perpendicular to the forward edges of the side walls, and preferably the pair of tines on each scoop includes inwardly facing or opposed, inclined forward end surfaces 47 defining points which serve to guide and maintain the alignment of the scoops upon closing thereof, note FIG. 2. In order to minimize the weight of the apparatus, the various components are preferably fabricated from a lightweight metal, such as aluminum or magnesium.

In operation, the workman lowers the scoop into the overhead gutter G in the manner shown in FIG. 1, and with the scoops in the open position. He then pulls downwardly on the cord 42, causing the forward edge 30 of the bottom wall 26 and tines 46 of each scoop to scrape along the bottom of the gutter G until the forward edges are brought together and the scoops close as seen in FIG. 5. The closed scoops are then lifted from the gutter and reopened at a point removed from the gutter, such that the enclosed debris falls to the ground. The relatively large size of the scoops permits the collection of a substantial quantity of debris within the enclosure formed by the scoops upon each closing operation. Further, the fact that the workman is able to positively close the scoops permits the bottom wall 30 and tines 46 to readily penetrate and overcome the resistance to closing which might be caused by heavy or matted leaves or other debris in the gutter.

Since the sleeve 36 and scoops 22 are freely rotatable in unison about the axis of the rod 16, the scoops are adapted to automatically assume the horizontal operative position with respect to the bottom of the gutter G as seen in FIG. 4, even when the pole 12 extends in an angular direction. This arrangement greatly facilitates the cleaning of a length of gutter from a single location, such as a window.

Since the upper portion of the apparatus may inadvertently come in contact with electrical wires during use, it is desirable that the apparatus incorporate means for precluding the passage of electrical current along the length of the pole. Such protective means may for example comprise the use of a reinforcing plug 14 positioned immediately below the scoops which is fabricated from a non-conductive plastic material or the like, and which further has a shoulder 14a thereon to preclude direct contact between the adjacent metal pole sections.

In the drawings and specifications, there has been set forth a preferred embodiment of the invention, and although specific terms are employed, they are used in a generic and descriptive sense only and not for purposes of limitation.

That which is claimed is:

1. An apparatus for remotely removing accumulated leaves and other debris from an overhead gutter of a building or the like, and comprising
    an elongate pole having one end adapted to be held by a workman and an opposite end adapted to reach above an overhead gutter or the like,
    a pair of cooperating scoops, with each of said scoops having a pair of side walls and a bottom wall to define a relatively large internal cavity adapted to receive a substantial quantity of debris therein,
    means mounting said scoops adjacent said opposite end of said pole for relative pivotal movement about an axis which extends transverse to the axis of said pole and such that said scoops are relatively pivotable between an open position wherein said cavities are separated and face generally toward said one end of said pole and a closed position wherein said cavities are substantially face to face and the scoops collectively define an enclosure of substantial volume, said scoops being freely rotatable in unison about said transverse axis to facilitate the alignment of said scoops with the bottom of a gutter when said pole is extended in an angular direction relative to the gutter,
    at least one tine attached to and extending forwardly from each scoop in a direction generally toward the other scoop such that the tines penetrate and grasp any debris positioned between the scoops as the scoops are pivoted to their closed position, and
    means operable from said one end of said pole for selectively pivoting said scoops between said open and closed positions,
    whereby a workman may lower the scoops into an overhead gutter with the scoops in said open position and then pivot the same to said closed position to collect a substantial quantity of debris within said enclosure.

2. The apparatus as defined in claim 1 wherein said pole comprises a plurality of releasably interconnected sections to permit adjustment of the length thereof and facilitate the storage and packaging of the apparatus.

3. The apparatus as defined in claim 1 wherein said means for selectively pivoting said scoops comprises a cord attached to at least one of said scoops and having a length sufficient to extend to said one end of said pole.

4. An apparatus for remotely removing accumulated leaves or other debris from an overhead gutter of a building or the like, and comprising
    an elongate pole having one end adapted to be held by a workman and an opposite end adapted to reach above an overhead gutter or the like,
    a support rod mounted adjacent said opposite end of said pole and extending in a direction substantially perpendicular to the axis of said pole,
    a pair of cooperating scoops pivotally mounted on said rod in spaced relation from said pole, each of said scoops comprising a pair of spaced apart flat side walls lying in parallel planes which are perpendicular to the axis of said rod, and a bottom wall extending between said side walls, said side and bottom walls having coplanar forward edges defining a plane which includes the axis of said rod, and with said forward edges being positioned entirely on one side of said rod, said scoops being mounted in opposing aligned relation on said rod such that the forward edges of the scoops generally face each other, and
    means operable by a workman at said one end of said pole for selectively pivoting said scoops between an open position wherein said forward edges of said scoops are disposed at an angle on the order of about 90 degrees with respect to each other, and a closed position wherein said forward edges substantially contact each other such that the scoops collectively define an enclosure of substantial volume,
    whereby a workman may lower the scoops into an overhead gutter with the scoops in said open position, and then pivot the same to said closed position to collect a substantial quantity of debris within said enclosure, and with the pole being disposed substantially vertically.

5. The apparatus as defined in claim 4 wherein said means for selectively pivoting said scoops includes means for resiliently biasing said scoops toward said open position, and a cord attached to each of said scoops and having a length to reach said one end of said pole for pivoting the scoops toward said closed position and against the force of said biasing means.

6. The apparatus as defined in claim 5 wherein said cord is of a Y-shaped configuration and includes a pair of upper segments and a unitary lower segment, and with each upper segment being interconnected to one of said scoops at a point radially spaced from said rod.

7. The apparatus as defined in claim 4 wherein each of said side walls has a generally triangular outline, and the side walls are interconnected to said rod at a point generally corresponding to one corner of the triangular outline.

8. The apparatus as defined in claim 4 wherein a tine is attached to each side wall of each scoop and extends forwardly therefrom to facilitate the grasping of any debris and maintain the alignment of the scoops upon closing thereof.

9. The apparatus as defined in claim 8 wherein said tines extend substantially perpendicular to the forward edges of said side wall and have a pointed forward end.

10. The apparatus as defined in claim 4 further comprising means for precluding the passage of electrical current along the length of said pole.

* * * * *